(12) United States Patent
Littwin et al.

(10) Patent No.: US 12,172,289 B2
(45) Date of Patent: Dec. 24, 2024

(54) PORTABLE TOOL FOR MOBILE USE

(71) Applicant: LUKAS Hydraulik GmbH, Erlangen (DE)

(72) Inventors: Thomas Littwin, Fürth (DE); Michael Pieper, Ansbach (DE)

(73) Assignee: LUKAS HYDRAULIK GMBH, Erlangen (DE)

( * ) Notice: Subject to any disclaimer, the term of this patent is extended or adjusted under 35 U.S.C. 154(b) by 203 days.

(21) Appl. No.: 17/642,631

(22) PCT Filed: Sep. 11, 2019

(86) PCT No.: PCT/EP2019/074265
§ 371 (c)(1),
(2) Date: Mar. 11, 2022

(87) PCT Pub. No.: WO2021/047774
PCT Pub. Date: Mar. 18, 2021

(65) Prior Publication Data
US 2022/0339773 A1  Oct. 27, 2022

(51) Int. Cl.
*B25F 5/02* (2006.01)
*A62B 3/00* (2006.01)
(Continued)

(52) U.S. Cl.
CPC ............... *B25F 5/02* (2013.01); *A62B 3/005* (2013.01); *H01M 50/213* (2021.01);
(Continued)

(58) Field of Classification Search
CPC ... A62B 3/005; B25F 5/02; B25F 5/00; B25F 3/00; H01M 50/24; H01M 50/247; H01M 50/296
See application file for complete search history.

(56) References Cited

U.S. PATENT DOCUMENTS 6,329,788 B1  12/2001  Bailey, Jr. et al.
7,180,031 B1  2/2007  Loibl et al.
(Continued)

FOREIGN PATENT DOCUMENTS

DE    G 93 10 597.5 U1   6/1994
EP    3213881 A1         9/2017
(Continued)

OTHER PUBLICATIONS

Niskikawa, Machine Translation of JP-2014087903-A, May 2014 (Year: 202).*

(Continued)

*Primary Examiner* — Veronica Martin
(74) *Attorney, Agent, or Firm* — Panitch Schwarze Belisario & Nadel LLP

(57) ABSTRACT

A portable tool for mobile use includes a housing, an electric motor located in the housing, an insert shaft on the tool, and a battery. The battery or a terminal for connecting to an external energy source is located in the insert shaft. A mechanically or hydraulically driven movable piston rod is for performing spreading, cutting, lifting, and/or pressing. An electronic device controls and/or regulates the electric motor and includes a printed circuit board with a potting compound on which electronic components are arranged. An electrically conductive on the insert shaft allows a releasable electric contact between the battery and the electronic device of the tool by inserting the battery into the insert shaft. The contact is divided into a first and second surface regions. The first surface region is covered with a nonconductive protective layer, and the second surface region is free of the protective layer.

19 Claims, 10 Drawing Sheets

(51) Int. Cl.
*H01M 50/213* (2021.01)
*H01M 50/24* (2021.01)
*H01M 50/247* (2021.01)
*H01M 50/287* (2021.01)
*H01M 50/296* (2021.01)

(52) U.S. Cl.
CPC ......... *H01M 50/24* (2021.01); *H01M 50/247* (2021.01); *H01M 50/287* (2021.01); *H01M 50/296* (2021.01); *H01M 2220/30* (2013.01)

(56) References Cited

U.S. PATENT DOCUMENTS

| | | | |
|---|---|---|---|
| 2004/0224544 A1 | 11/2004 | Suwa et al. | |
| 2015/0282337 A1* | 10/2015 | Ekstrom | H01H 9/061 173/170 |
| 2017/0252912 A1* | 9/2017 | Barezzani | B23D 15/14 |
| 2020/0251696 A1* | 8/2020 | Qiao | H01M 10/425 |

FOREIGN PATENT DOCUMENTS

| | | | |
|---|---|---|---|
| EP | 3686950 A1 | 7/2020 | |
| JP | 200040549 A | 2/2000 | |
| JP | 200040550 A | 2/2000 | |
| JP | 2002319382 A | 10/2002 | |
| JP | 2004288272 A | 10/2004 | |
| JP | 2006237019 A | 9/2006 | |
| JP | 200787947 A | 4/2007 | |
| JP | 201254086 A | 3/2012 | |
| JP | 2014087903 A * | 5/2014 | ................ B25F 5/02 |
| JP | 201719020 A | 1/2017 | |
| JP | 2017213671 A | 12/2017 | |
| KR | 10-2002641 B1 | 7/2019 | |
| WO | 2019057187 A1 | 3/2019 | |

OTHER PUBLICATIONS

Nishikawa, Machine Translation of JP-2014087903-A, May 2014 (Year: 2023).*

Office Action issued Jul. 11, 2023 in JP Application No. 2022-515923.

International Search Report and Written Opinion of the International Searching Authority for International Patent Application No. PCT/EP2019/074265 mailed Jun. 9, 2020, 12 pages.

Office Action issued Jan. 16, 2024 in JP Application No. 2022-515923 (Machine translation).

* cited by examiner

PORTABLE TOOL FOR MOBILE USE

This application is a National Stage Application of PCT/EP2019/074265, filed 11 Sep. 2019, and which application is incorporated herein by reference. To the extent appropriate, a claim of priority is made to the above-disclosed application.

The present application relates to an electromechanical or electrohydraulic tool for portable use such as a spreading tool, cutting tool, or combination tool with cutting and spreading functions or a lifting cylinder (or rescue cylinder). The aforementioned are preferably used for rescue operations but can also be used for work. The present application also relates to a battery for use in a corresponding tool and to an arrangement comprising a tool and a battery for operating the same.

TECHNOLOGICAL BACKGROUND

Portable, motor-driven electromechanical or electrohydraulic tools or rescue tools of the type of interest in this case are used in a wide variety of applications. For example, there are spreading tools, cutting tools, or so-called combination tools, i.e. tools with cutting and spreading functions, as well as rescue cylinders that are used by emergency services (fire brigade), for example in order to rescue injured people from accident vehicles or to rescue earthquake victims. The type of tool or rescue tools is varied in this case. There are electrohydraulically or electromechanically driven tools or rescue tools with, preferably hardened, tool inserts for cutting, spreading, or pressing. Tools of this type are exposed to extremely high mechanical requirements in use and are subject to a wide variety of environmental influences (heat, cold, moisture) depending on the place of use.

It is of particular importance in this case that rescue tools in particular ensure particularly high operational reliability when in use, since in particular rescue operations always have to be carried out quickly and sudden operational failures can therefore have fatal consequences.

Battery-powered electromechanical or electrohydraulic tools are of interest for a wide variety of purposes due to their easy handling. For example, in specific work or rescue situations (e.g. in the military, on offshore platforms for oil or gas, on offshore wind farms, etc.), corresponding tools could theoretically also be operated under water because of their ease of handling. However, previous battery-operated tools were not suitable for underwater use.

DOCUMENTED PRIOR ART

G 93 10 597.5 discloses a battery-operated underwater electrical tool in the form of, for example, a pump. The underwater electrical tool has a waterproof tubular housing into which a housing end part equipped with O-sealing rings inserted in circumferential grooves is pressed. The construction is very complex.

OBJECT OF THE PRESENT INVENTION

The object of the present invention is to provide a tool which, on the one hand, allows use under water and, on the other hand, can be implemented with simple structural means. Furthermore, the object of the present invention is to provide a battery which can be used for a corresponding tool.

Solution of the Problem

The fact that the contact of the tool is divided into a first surface region and a second surface region, the first surface region is covered with a nonconductive surface protective layer, and the second surface region is free of a surface protective layer, makes it possible to use a correspondingly equipped tool under water, in particular even to operate under salt water, without electrochemical processes adversely affecting the tool when operating the tool under water. The surface protective layer isolates the first surface region of contact from water, in particular from highly conductive salt water. The constructive measure results in the fact that, despite a very high electrical conductivity of salt water, the first surface region covered with a surface protective layer with the water does not cause any, at least no substantial, current flow, and consequently no significant corrosion phenomena take place. Only the second surface region, which has no surface protective layer, is intended to have direct contact with the contacts of the battery when it is paired with the battery. At the same time, however, a sufficient current flow is made possible over the cross section of the contact in the paired state with the battery from the battery to the tool. This is important because, when turning on the tool for a few milliseconds, for example up to 60 amperes of current can be drawn from the battery. Up to approx. 40 amperes can be reached during operation. Likewise, the contact can be designed with a sufficient length, preferably as an insert-oriented flat contact, in order to ensure the necessary mechanical stability on a printed circuit board. The contact or flat contact can be a conventional contact sheet or a metal contact provided with a galvanic protective layer on which the surface protective layer is located in the first region. In addition, the invention allows existing tools to be upgraded in a simple manner.

The second surface region is provided on the contact, preferably on the side of the contact located in the insertion direction.

The first surface region is expediently larger than the second surface region. This increases the mechanical stability and the possibility of drawing particularly high currents. The second surface region, i.e. the surface region covered with the surface protective layer, preferably also comprises the front face of the contact. The contact is thus completely covered with the surface protective layer, except for the surface region free of the second surface protective layer. The front faces in this region can preferably also be covered by the surface protective layer.

The relevant contact expediently has at least one contact foot which is connected, preferably soldered, to a printed circuit board. The region of the connection between the contact and the printed circuit board is expediently potted or encapsulated by means of potting compound.

The contact can be arranged on the housing of the battery receptacle in such a way that it protrudes from the printed circuit board on the inner wall of the housing through the latter to the outside.

A plurality of contacts are expediently arranged parallel to one another, oriented in the insertion direction.

According to an expedient embodiment of the present invention, the surface protective layer is a lacquer layer, in particular a covering lacquer layer, preferably based on acrylic. The lacquer layer prevents electrical current from flowing to the surrounding water.

Alternatively, instead of a lacquer layer, a layer of potting compound can also be provided as a surface protective layer, preferably a potting compound based on a casting resin or based on PU, epoxy or silicone. This also allows for effective surface protection of the contact to be achieved.

The tool can also be operated even if water penetrates into the interior of the housing because a brushless direct-current motor (BLDC motor) is provided as the electric motor, the electronic components of the printed circuit board are enclosed with potting compound to protect against the ingress of water, and the terminal elements of the control cable are protected against the ingress of water. It was found that water contact between the rotor and the permanent magnets is harmless. It is only necessary to protect the connection means of the control cable against the ingress of water by means of a seal.

Expediently, no protective and/or sealing measures against the ingress of water into the interior of the housing when immersing the housing or the tool in water therefore need to be provided on the housing of the tool.

The above object is achieved with the generic battery by the features of claim 11.

According to the invention, the battery has a battery housing that is sealed against the ingress of water, battery cells arranged within the battery housing, and a terminal region not protected against water for an electrical connection of the battery to the terminal shaft or insert shaft of a tool, wherein the terminal region has at least one contacting chamber which is accommodated in the battery housing and is accessible from the outside via a slot-like passage opening, in which contacting chamber at least one contact element is located, preferably in the form of a contact clip. A corresponding battery is able to make contact with the contact of the tool on the second surface region when a tool of the type described above is used under water, in particular under salt water, without the water being able to cause corrosion and thus destruction of the contact when the current flows.

Because the terminal region is designed as an elevation on the battery housing, the terminal region can be connected to the tool in a simple manner by a linear displacement to the contact or contacts of the tool.

In order to protect against the ingress of water into the contacting chamber, it has proven to be particularly effective to provide a resilient closure device in the region of the slot-like passage opening, which closure device deforms when the contact is inserted through the passage opening, allows access, but rests sealingly against the sides of the contact.

An arrangement of at least two sealing elements, in particular in the form of flexible platelets or sealing beads oriented transversely to the slot-like passage opening, can preferably be provided as the resilient closure device. For example, these can consist of rubber or resilient plastics material.

The two platelets oriented transversely to the slot-like passage opening can touch one another on the front, form a slight gap to one another, or else overlap.

An even better protection against the ingress of water is achieved if the contacting chamber is additionally filled with a gel-like compound.

The gel-like compound should be nonconductive. The gel-like compound expediently has a specific resistance of greater than $1 \times 10^{10} \Omega \times mm^2/m$, preferably greater than $1 \times 10^{13} \Omega \times mm^2/m$, particularly preferably greater than $1 \times 10^{15} \Omega \times mm^2/m$.

This can be a crosslinked silicone-based gel.

The resilient closure device, in conjunction with the gel-like compound, also causes the resilient closure device to strip off the gel-like compound from the contact of the tool when removing the battery from the receiving slot by pulling the contact of the tool out of the contacting chamber.

DESCRIPTION OF THE INVENTION USING EMBODIMENTS

A preferred embodiment of the present invention will now be described in detail. For the sake of clarity, recurring features are provided only once with a reference sign. In the drawings.

Figure 1:
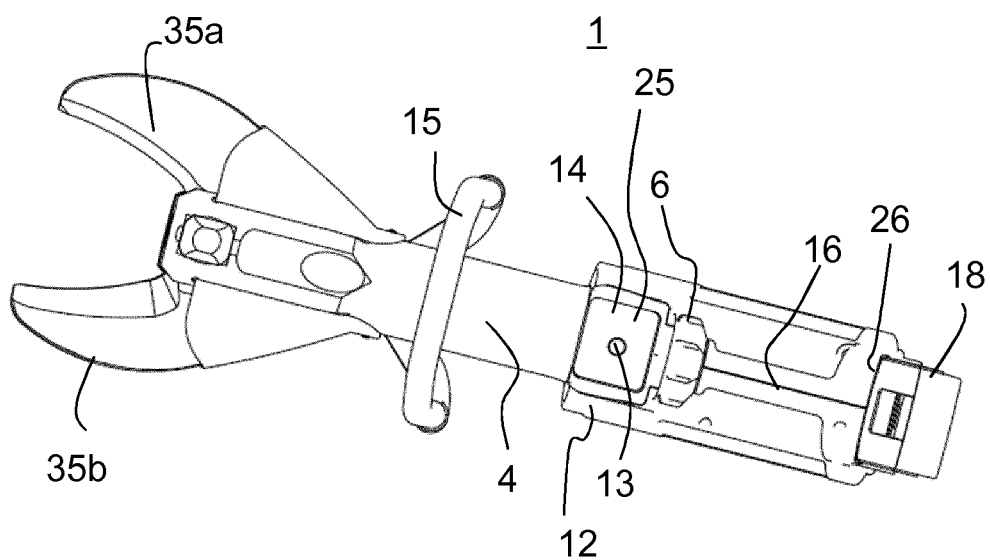
FIG. 1 is the representation of an overall view of an example of a tool in the form of an electro-hydraulic, battery-operated cutting tool according to the invention.

Reference sign 1 in FIG. 1 denotes an example of a tool according to the invention in its entirety. In the embodiment according to FIG. 1, the tool 1 is an electro-hydraulic, battery-operated cutting tool (cutter). The tool 1 comprises a housing 12 in which an electric motor 3 in the form of a brushless direct-current motor (BLDC motor), a hydraulic pump 2 (piston compressor 2*a*, 2*b*), and a hydraulic tank 19 having hydraulic fluid 30 are located (cf. also FIGS. 2 and 3). In addition, a compensating device is provided for compensating the volume of the hydraulic fluid during operation of the tool 1. This can be, for example, a flexible membrane or an entirely flexible hydraulic tank. A control panel 25 having a display 14 and an on/off switch 13 is attached to the housing 12. The operator can read the operating states on the display 14. An insert shaft 26 for a battery 18 is provided on the rear of the housing. Instead of the battery, an energy supply unit (not shown in FIG. 1) could also be inserted at this point. The nominal voltage for operating the tool is for example 24 volts.

In the example shown, two tool halves 35*a*, 35*b*, which are cutting tool halves in the embodiment shown in FIG. 1, are located on the front side of the tool 1. The two cutting tool halves are driven via a piston rod (not shown in FIG. 1). The latter is located in a hydraulic cylinder 4. A first hand grip 15 is located in the region of the hydraulic cylinder 4. A second hand grip 16 is provided on the housing 12. The tool 1 can thus be guided or operated by the operator with two hands. Using a manually operated hydraulic valve 6 (control valve), the operator can manually control the direction of the hydraulic flow with the hand located on the second hand grip 16 so that the piston rod is either retracted (with the tool halves 35a, 35b being closed) or extended (with the tool halves 35a, 35b being opened) or hydraulic oil is returned to the supply circuit, i.e. to the hydraulic tank (bypass operation).

The embodiment of the control valve 6 shown in FIG. 1 is a control valve which can be rotated in the extension of the axis of the hand grip 16 and has a so-called star handle which is rotated by the operator to control the switching positions. The housing 12 comprises two housing shells which (cf. FIG. 3) are connected to one another via connecting elements 7, for example screws. No seal is provided to protect against the ingress of water into the housing 12 when immersing the housing 12 in water. The rotor of the brushless direct-current motor is not protected from water.

The tools in question in this case are able to be operated in any spatial arrangement or orientation.

Instead of the cutting tool described above, the invention can also be designed as a spreading tool, a combination tool having cutting and spreading functions, or as a lifting or rescue cylinder. A piston rod that is guided in a cylinder, for example a hydraulic cylinder, is used in all of these tools.

Figure 2:
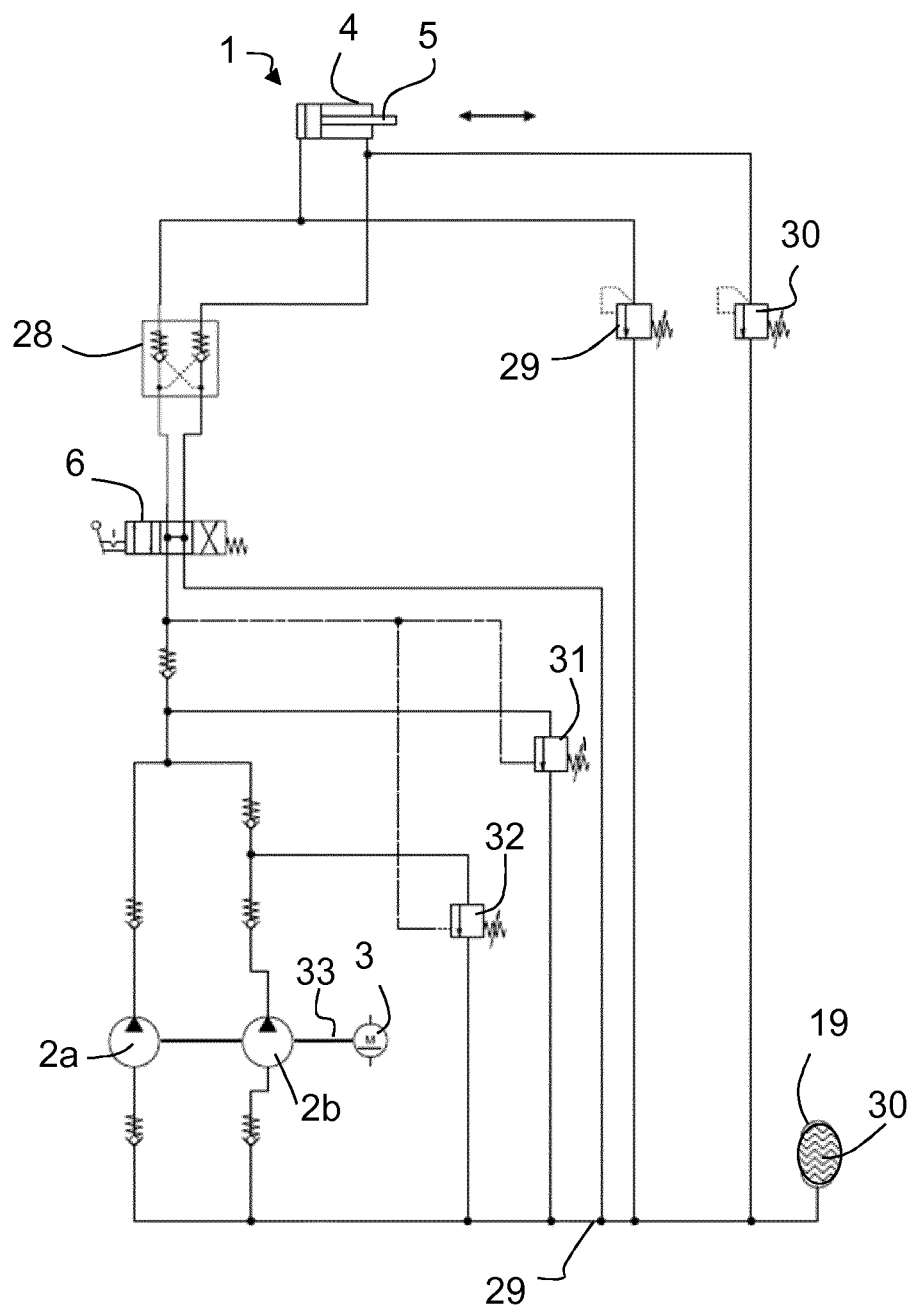
FIG. 2 is an example of a hydraulic circuit diagram of the cutting tool according to FIG. 1.

FIG. 2 shows an example of a hydraulic circuit diagram of a tool according to FIG. 1. The electric motor is a brushless direct-current motor which drives a hydraulic pump 2 in the form of two piston compressors 2a, 2b via an eccentric shaft 36. The piston compressor 2b can have a greater delivery rate than the piston compressor 2a. The delivery flow of the piston compressor 2b is, for example, passed to a pressure switching valve 32. The delivery flow of the piston compressor 2a is also passed to the pressure switching valve 32 as a control signal. The pressure switching valve 32 can be set to a specific pressure switching value by means of spring force. If the pressure in the control line of the piston compressor 2a exceeds this pressure switching value, the pressure switching valve 32 is opened and the delivery flow of the piston compressor 2b is diverted into the tank 19. This ensures that the drive power required by the system remains within the available drive power.

The delivery flow branches in the further course in the direction of the switching valve 6 and the pressure shut-off valve 31. The pressure shut-off valve 31 is set to the permissible system pressure by means of spring force. If the pressure exceeds the set permissible system pressure, the pressure shut-off valve 31 opens and allows the delivery flow to flow back into the tank until the pressure falls below the permissible pressure again.

The control valve 6 is operated manually by the user by means of a star handle (cf. FIG. 1). It has a spring-assisted reset function in the neutral position. In the neutral position (as shown), it is located in the middle position. In this position, all connected lines are connected to the tank so that no pressure can build up and the system does not move. If the control valve 6 is deflected, for example, to the right, then in the left connection line the pressurized delivery flow is conveyed in the direction of the double-releasable check valve 28. On the right connection line, hydraulic oil that comes from the direction of the double-releasable check valve 28 is returned to the tank 19. If the control valve 6 is deflected to the left, the process just described is reversed, so that ultimately the direction of movement of the tool is reversed. The delivery flow that is conveyed into the left connection line of the double releasable check valve 28 opens a spring-loaded check valve in the left connection line and, via a control line that is guided to the right connection line, also opens the check valve located there. This ensures that, on the one hand, the delivery flow in the left connection line can be fed to the hydraulic cylinder 4 of the tool. On the other hand, it is ensured that the hydraulic oil that is displaced out of the cylinder by the hydraulic cylinder 4 on the right-hand side can be returned to the system's tank 19 through the double-releasable check valve 28 on the right-hand connection line.

The hydraulic cylinder 4 has a branch to safety valves 29, 30 at both terminals. These safety valves 29, 30 ensure that the pressure in the cylinder chambers cannot rise higher than permitted. If the pressure in one or in both cylinder chambers rises above the safety-related permissible pressure, these valves open a connection to the tank 19 so that the pressure can decrease again. An elevation of the pressure inside the hydraulic cylinder 4 can occur, for example, because forces acting on the piston of the hydraulic cylinder 4 from outside additionally compress the hydraulic oil. Devices are attached to the piston rod 5 of the hydraulic cylinder 4 which move, for example, a shear knife, a spreader, or the like. The tank 19 can, for example, be designed as a flexible rubber bellows and at the same time serves as a compensating device.

Figure 3:
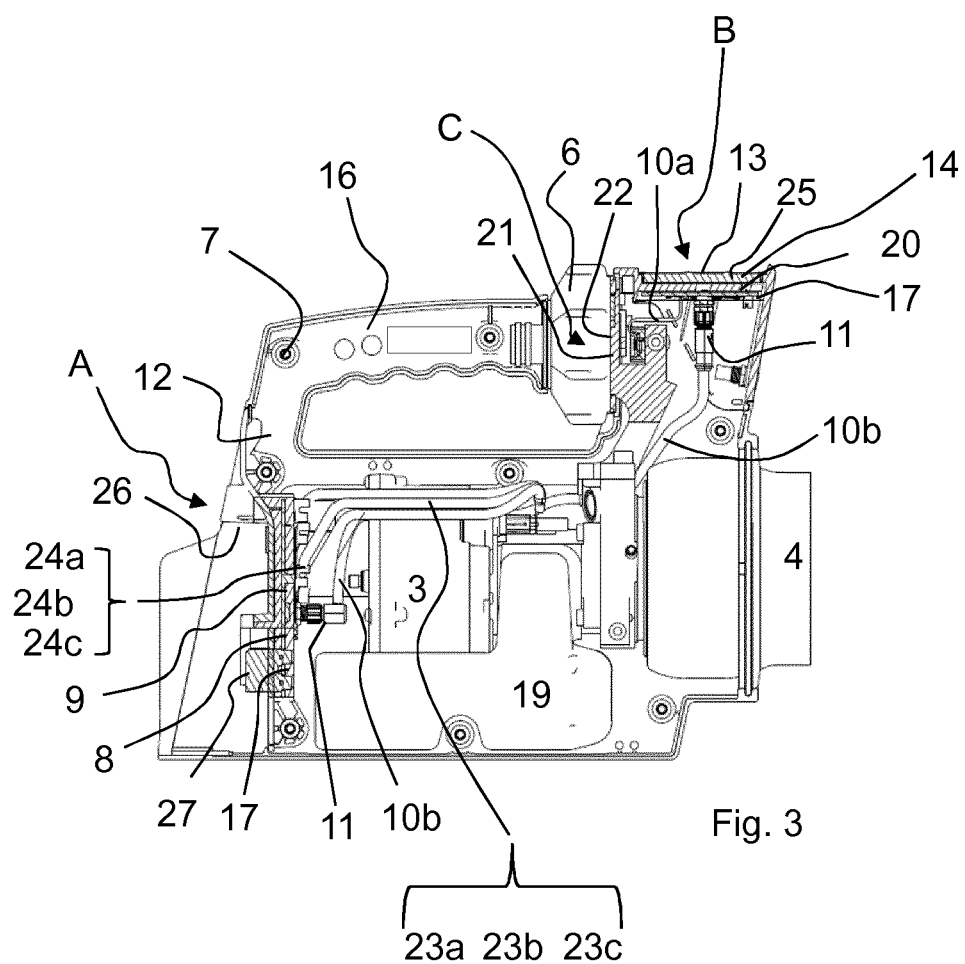
FIG. 3 is a partial sectional representation of the housing region of the tool according to the invention in accordance with FIG. 1.

FIG. 3 shows, in a partial sectional representation, the interior of the region of the housing 12 of the tool 1 from FIG. 1. The electronic control and regulating device for controlling and/or regulating comprises a printed circuit board 8 having electronic components 9, which in particular relate to the power supply for the brushless direct-current motor. Furthermore, in the region of the on/off switch 13, a control panel having a display 14 is provided, which comprises its own printed circuit board 20. The control panel of the display 14 is preferably a waterproof membrane keyboard. The necessary operations can be carried out using the membrane keyboard. Furthermore, a further printed circuit board 22 is provided in the region of the control valve 6, on which printed circuit board a sensor 21, in particular a magnetic sensor, is located as an electronic component for detecting the deflection of the star handle of the control valve 6. With the rotation of the star handle, not only is the hydraulic position of the control valve 6 changed, but also the electric motor is switched on or off and/or a turbo function is switched on and/or off via the angular position of the star handle. The sensor 21 is connected to the printed circuit board 20 via a control line 10a. The printed circuit board 20 is connected to the printed circuit board 8 that represents the main printed circuit board, via a further control line 10b. The control line 10b is connected to the printed circuit board 20 and/or the printed circuit board 8 via waterproof connection means 11. A part of the corresponding connection means 11 can be arranged on the printed circuit board side and can preferably also be partially embedded there. The opposite part of the connection means 11 is located on the control line 10a or 10b. The connection means 11 can be a plug-in connection and/or rotary connection which is sealed by a sealing means (not shown in the drawings), for example an O-ring.

The control lines 10a and/or 10b are each lines via which control signals are sent. A direct connection to the printed circuit board is provided in the embodiment according to FIG. 3, for example via a soldered connection, as connection means 11 of the control line 10a to the electronic components of the printed circuit board 20, and the printed circuit board 22 of the sensor 21. Plug-in and/or rotary connectors are provided in FIG. 3 as the connection means 11 of the control line 10b between the printed circuit board 8 and the printed circuit board 20.

Furthermore, in the region of the printed circuit board 8, power cables for the power supply of the electric motor 3 are arranged, which power cables are in electrical connection with contacts 27 for the battery or an energy supply unit. As best shown in FIGS. 9a, 11, 13 and 15, the contacts 27 are generally flat. In the example shown, there is a three-phase connection with three power cables 23a, 23b and 23c. In particular, the electrical terminals 24a to 24c of the power cables 23a, 23b and 23c for the power supply of the electric motor 3 can be spaced apart by a sufficient distance from one another, which ensures that, in the event that the terminals 24a to 24c are surrounded by water during electrical operating conditions of the tool, (e.g. with a nominal voltage of 24 volts), no electrical short-circuit occurs via the water as the electrical conduction medium. Corresponding terminals are also provided on the electric motor 3 but cannot be seen in FIG. 3.

Figure 4:
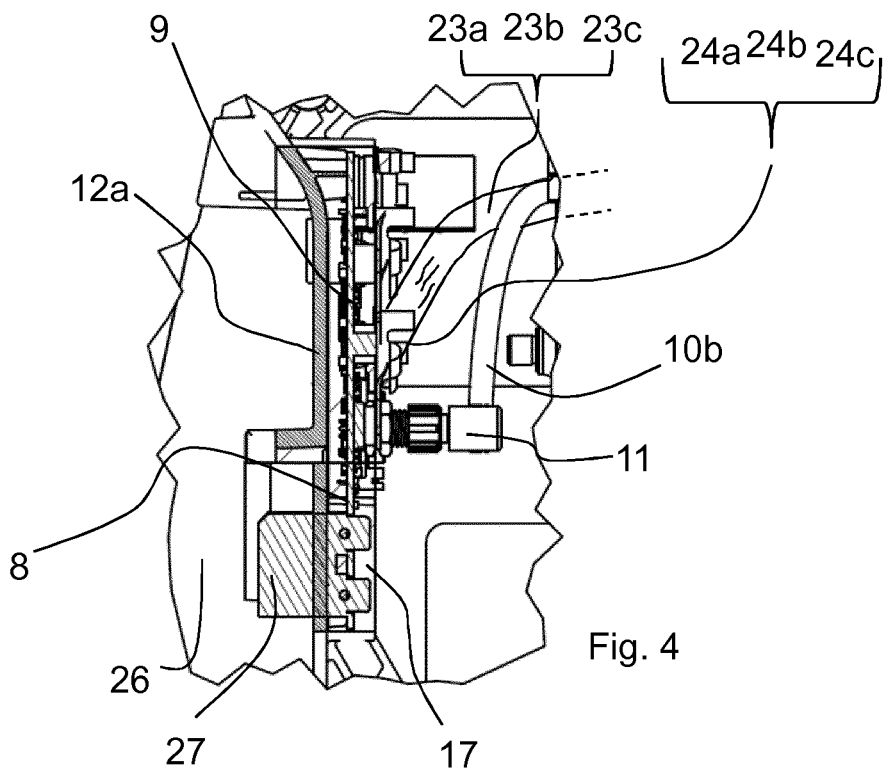
FIG. 4 is an enlarged representation of the region A of FIG. 3.

In the region of the insert shaft 26, open contacts 27, which are unprotected from water, are provided for electrical contact with a battery (not shown in FIG. 4) or an energy supply unit. The contacts 27 are also at a sufficient distance from one another, which ensures that, in the event that the contacts 27 are surrounded by water, no electrical short-circuit occurs during the electrical operating conditions of the tool via the water as the electrical conduction medium. The contacts 27 and the printed circuit board 8 are fastened to a housing part 12a (battery holder). The control line 10b comprises connection means 11 which are protected from water.

Figure 5:
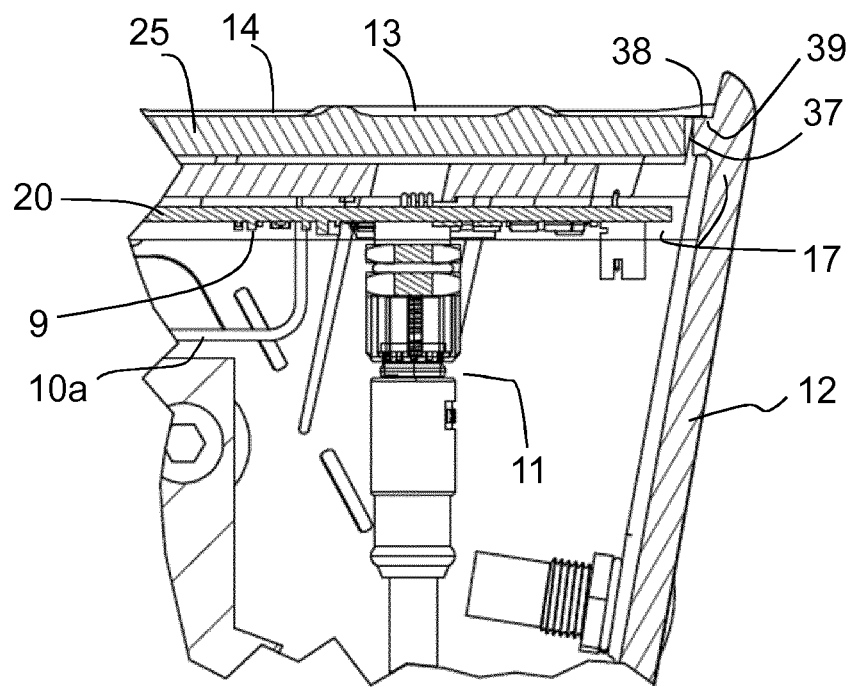
FIG. 5 is an enlarged representation of the region B of FIG. 3.

From the enlarged partial representation of FIG. 5, the electronic components 9 of the printed circuit board 20 can be seen, which are enclosed by potting compound 17. The printed circuit board side part of the connection means 11 for the printed circuit board 20 can also be seen in FIG. 5. The control panel 25 is designed as a membrane keyboard. This is a sandwich-shaped membrane layer structure. The front edge of the control panel 25, i.e. of this structure, is also covered by potting compound 17. For this purpose, a gap 37 to the housing 12, which preferably runs completely around the control panel 25, is seen in the region of the front edge of the control panel 25. The gap 37 is covered on the outside by a protrusion 38 of the control panel 25 or the membrane keyboard (e.g. in the form of a protruding membrane layer on the top, which membrane layer is glued to a step 39 of the housing 12), so that a circumferential annular blind hole is created which can be filled with potting compound 17. In this way, the entire region can be potted "overhead" with potting compound 17.

Figure 6:
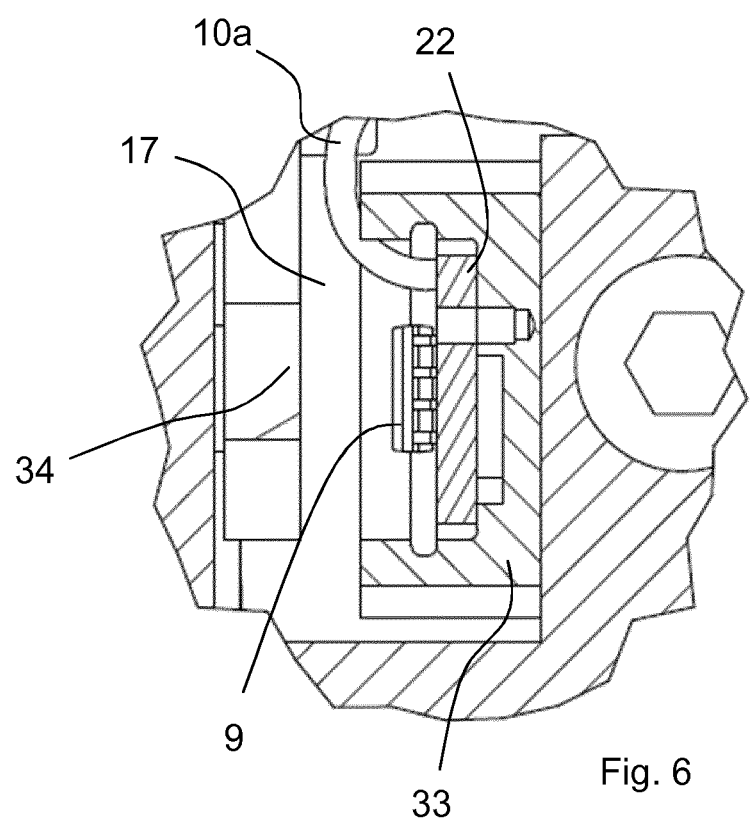
FIG. 6 is an enlarged representation of the region C of FIG. 3.

The enlarged partial representation of FIG. 6 shows the magnetic sensor 21 for determining the deflection of the star handle. This is located on its own printed circuit board 22 which is accommodated in a sensor holder 33 in the form of a pocket-shaped recess. The magnetic sensor 21 and the printed circuit board 22 are sealed off from the outside of the sensor holder 33 by a potting compound 17. The potting compound 17 thus closes the pocket-like recess of the sensor holder 33 to the outside. The control line 10a, which leads from the printed circuit board 22 to the printed circuit board 20 of the control panel or display 14, is also connected to the printed circuit board 22 and enclosed by the potting compound 17. There, the end region of the control line 10a is also enclosed by potting compound 17.

Figure 7:
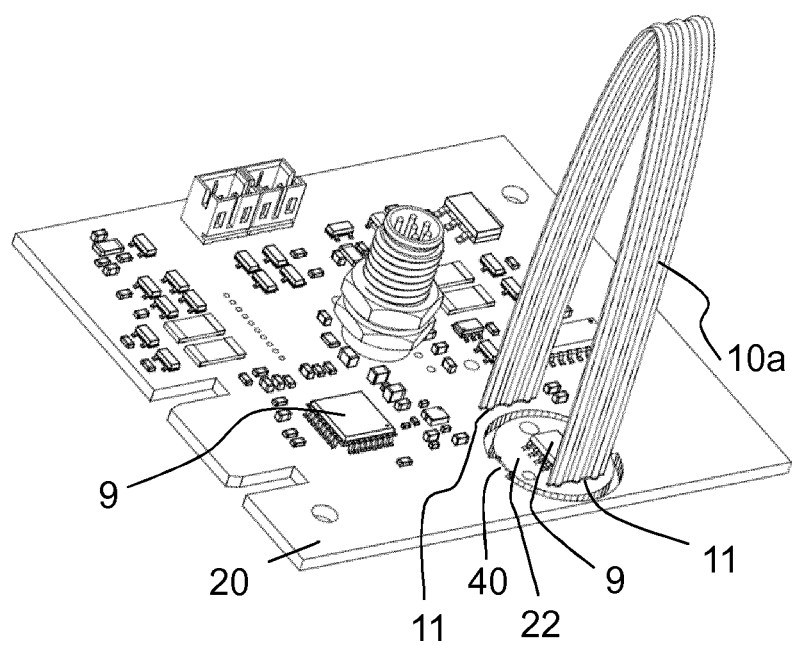
FIG. 7 is a perspective representation of an example of a printed circuit board assembly for use in the scope of the present invention.

FIG. 7 shows the two printed circuit boards 20, 22 having electronic components 9 (the printed circuit board 22 having an electronic component, for example in the form of the magnetic sensor 21) in the initial state before assembly. They consist of the same printed circuit board base material. The printed circuit board 22 is defined as a removal region from the other printed circuit board 20. The two printed circuit boards 20, 22 are connected via the control cable 10a. A soldered connection is provided as the respective connection means 11 on both printed circuit boards 20, 22. Furthermore, two predetermined separation points 40 are provided (only one of which can be seen in FIG. 7), which separation points must be destroyed in order to remove the printed circuit board 22, as a result of which the printed circuit board 22 can be removed with the wiring. The connection means 11 are then enclosed when casting the printed circuit boards 20, 22 with potting compound 17.

Figure 8:
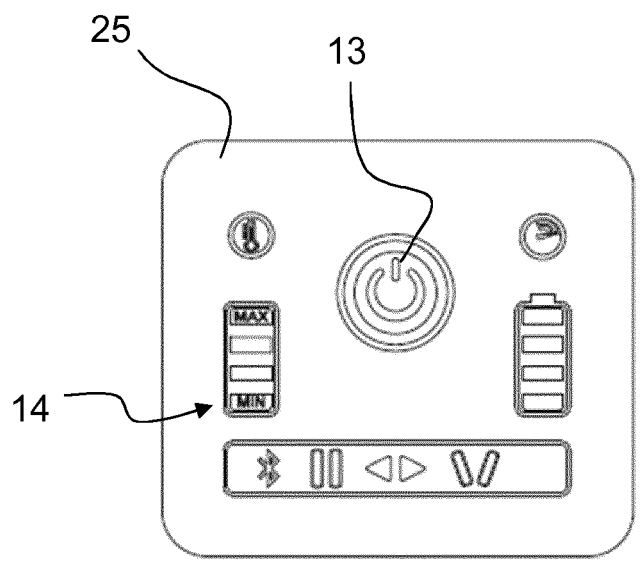
FIG. 8 is a plan view of an example of a control panel having a display arrangement according to the present invention.

FIG. 8 is an enlarged, isolated representation of the control panel 25 with the on/off switch 13 and the display 14 with various displays and control panels. The control panel 25 is preferably designed as a waterproof membrane keyboard.

The present invention makes it possible to operate the tool 1 also under water without the housing 12 having to be sealed. This new, important functionality can thus be achieved without complex conversion measures or without any significant increase in manufacturing costs.

The electronic components of the printed circuit board 8, 20, and/or 22 are in particular microcontrollers, frequency converters, memory modules, electronic switches, measuring devices such as, for example, integrated semiconductor temperature sensors and/or LEDs.

The display 14 comprises a display device, which in turn can include, for example, a load display and/or operating status display and/or temperature display.

The battery 18 has a waterproof housing or at least an independent waterproof encapsulation.

The on/off switch 13 is a waterproof on/off switch, for example a membrane switch or a push button switch.

A potting compound based on PU, epoxy, or silicone can preferably be used as the potting compound. A silicone-based potting compound is particularly suitable if elevated temperatures occur during operation of the tool 1.

As an alternative to the battery 18, it is also possible in normal operation, i.e. not under water, for a power supply unit (not shown in the figures) to be inserted into the insert shaft 26, which power supply unit is connected to the network via a cable.

Figure 9A:
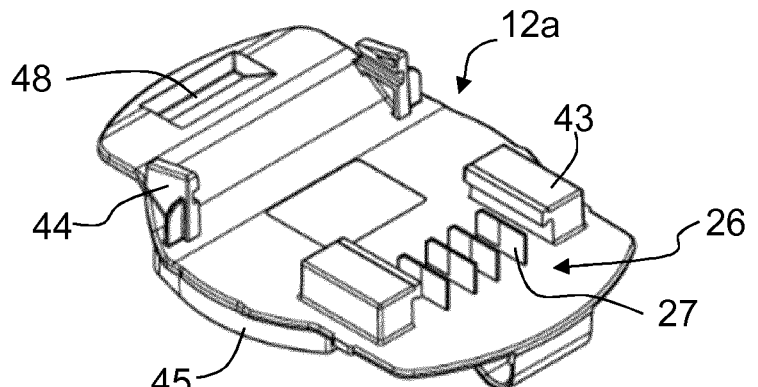
FIG. 9 is different views of an example of a housing region in the region of the battery holder in a perspective outside view (FIG. 9*a*), in a perspective inside view without potting compound (FIG. 9*b*) and in a perspective inside view with potting compound (FIG. 9*c*)

Reference sign 12a shows the housing in the region of the battery holder in FIG. 9a in a perspective representation. This can be an independent housing portion which is completed with the rest of the housing of the tool 1. The housing 12a of the battery receptacle has two opposite L-shaped guide webs 43 which together form the insert shaft 26 for the battery 18 shown. A plurality of contacts 27 in the form of elongated flat contacts are provided which are oriented in the insertion direction so as to be arranged parallel to one another between the two guide webs 43. They are used to contact the corresponding contacts in the battery. Furthermore, the part 12a comprises two further guide webs 44 which receive corresponding guide lugs 58 (cf. FIG. 10). A recess 48 is located at the upper end of the part 12a, into which recess a corresponding holding projection 59 of the battery 18 (cf. FIG. 12) engages.

Figure 9B:
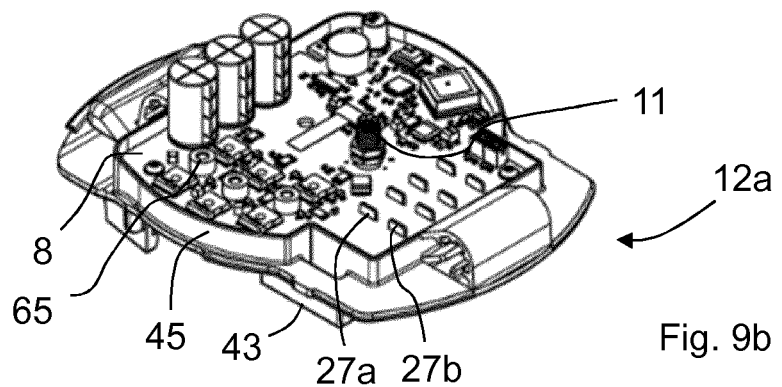
Figure 9C:
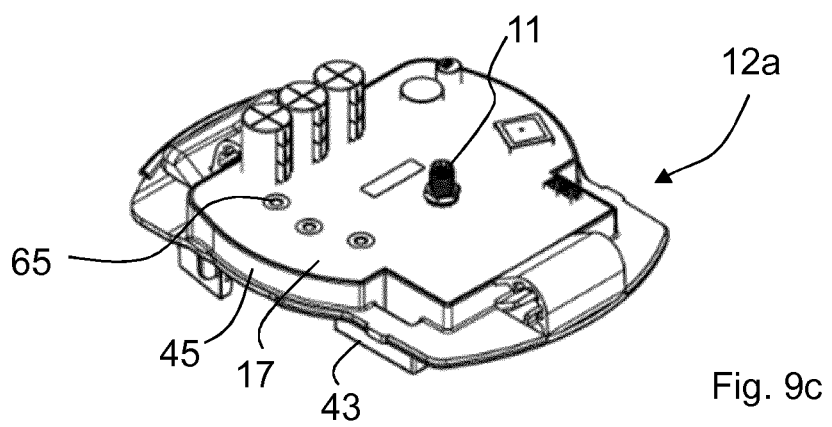

The respective contacts 27 are fastened to the latter via contact feet 27a, 27b passed through the printed circuit board or are soldered to the latter, as can be seen from FIG. 9b. The printed circuit board 8 is surrounded by a circumferential frame 45 which is intended to encapsulate the circuit board 8 and the electronic components located thereon with potting compound 17, as can be seen from FIG. 9c. Only the connection means 11 and a plurality of fastening connections 65 are not surrounded by potting compound.

The entire region of the electronic components including the terminal of the contacts 27 to the printed circuit board 8 are thus protected against the ingress of water by encapsulation with potting compound 17. The contacts 27 protrude through the housing 12a on the outside between the two guide webs 43.

Figure 10:
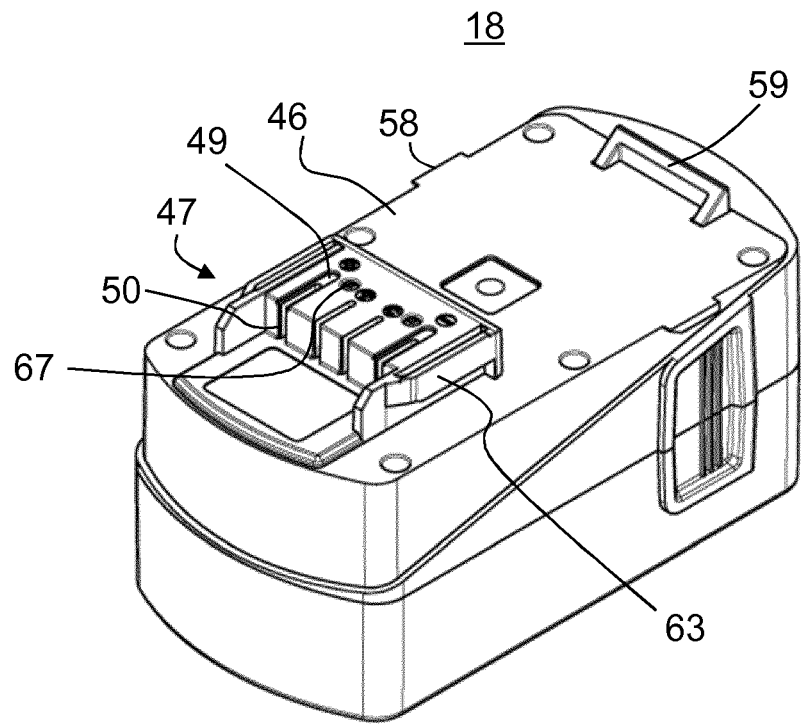
FIG. 10 is a perspective representation of an example of a battery according to the invention.

FIG. 10 shows an example of a battery 18 according to the invention for use with a tool 1 according to the invention. The battery 18 has a battery housing 46 which consists of two housing shells which are connected to one another in a waterproof manner. The battery 18 comprises a terminal region 47 which is somewhat raised compared to the rest of the battery housing 46, the terminal region having two laterally positioned guides 63. A plurality of contacting chambers 49, each comprising slot-like passage openings 50 for receiving the contacts 27 of the tool, is located in the interior of the terminal region 47. The slot-like passage openings 50 are formed both on the top side and on the front face of the terminal region 47. Guide lugs 58 are located in the side region, which guide lugs engage in the recesses of the guide webs 44 of the housing wall 12a. Furthermore, a holding projection 59 is provided at the end side which engages in the corresponding recess 48 on the housing part 12a. The terminal region 47 is preferably formed in multiple parts and is connected to the housing 46 via suitable fastening means 67.

Figure 11:
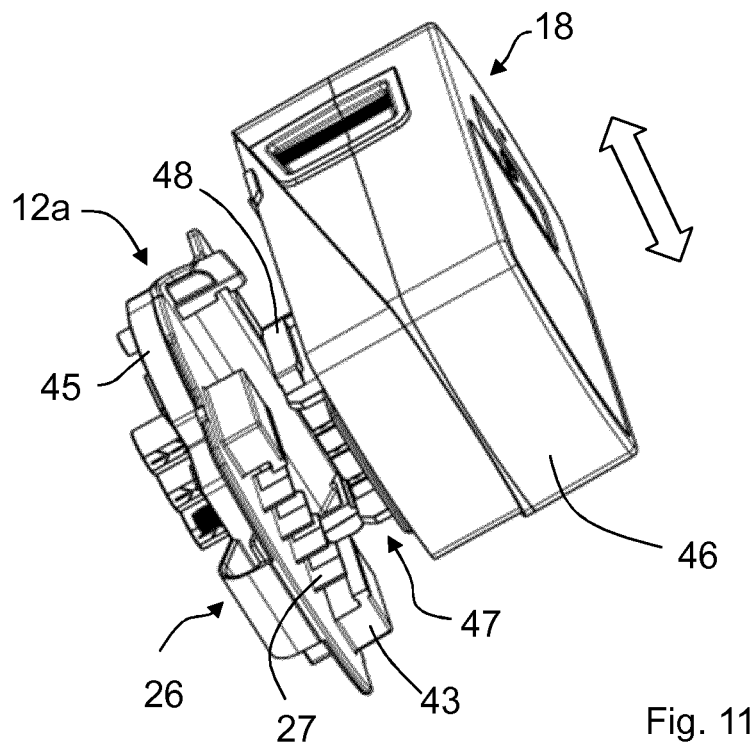
FIG. 11 is a perspective representation of the orientation of the parts to one another when the battery according to FIG. 10 is pushed onto the battery holder of the tool, only the housing part carrying the battery holder being shown.

FIG. 11 shows the terminal region 47 of the battery 18 being pushed into the insert shaft 26 of the housing part 12a of the tool. The battery 18 having its terminal region 47 is placed in front of the guide webs 43 and then shifted in the direction of the contacts 27 of the housing part 12a (see arrow), whereby the contacts 27 engage through the slot-like passage openings 50 into the respective contacting chambers 49.

Figure 12:
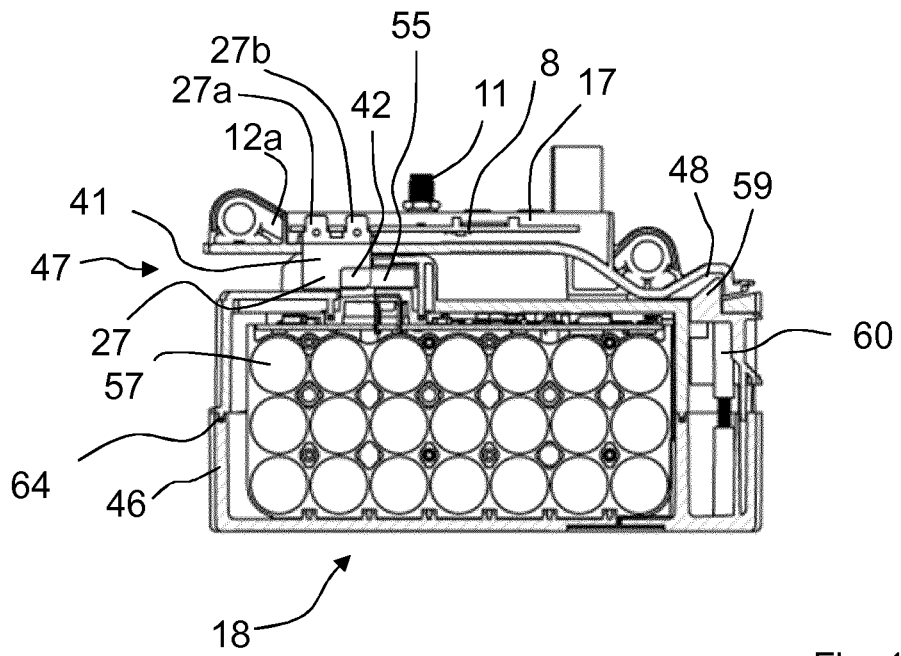
FIG. 12 is a sectional representation through the assembled parts according to FIG. 11.

FIG. 12 shows the housing part 12a of the tool, paired with the battery 18. The remaining components of the tool are not shown for the sake of clarity. The representation shows the individual battery cells 57 surrounded by the two-part battery housing 46. The battery housing 46 is secured against the ingress of water by a circumferential seal 64 which is located in a corresponding recess in the end contact region of the two housing shells. The battery 18 is held on the housing part 12a via the holding projection 59 which engages in the recess 48 of the housing part 12a. This engagement can be released by a manually operated release mechanism 60 if necessary and the battery can be pushed out of the insert shaft 26. It can be seen from FIG. 12 that a contact clip 55 makes contact with the contact 27 in the second region 42, whereas the first region 41 is not contacted. The current is therefore tapped only at the second region 42 of the contact 27. The current is thus drawn via the second region 42 and fed to the printed circuit board 8 or the electronic components located there. The second surface region 42 is positioned on the contact 27 on the side of the contact 27 in the insertion direction.

Figure 13:
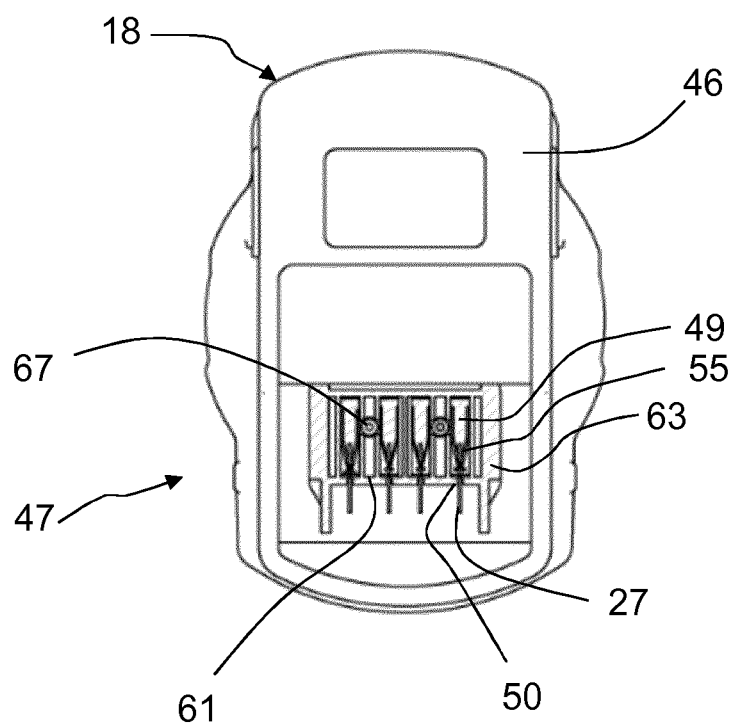
FIG. 13 is a partial sectional representation of the battery with the terminal region cut open.

For a better understanding, the connection region 47 is shown as a partial sectional illustration in FIG. 13, so that the interior of the terminal region 47 is more clearly visible.

In the interior of the terminal region 47, in the embodiment shown in FIG. 13, a total of four contacting chambers 49 are provided, each contacting chamber 49 being provided for contacting a contact 27. In FIG. 13, only the contact 27 is shown for this, which contact extends through the corresponding slot-like passage opening 50 into the relevant contacting chamber 49. The individual contacting chambers 49 are separated from one another by chamber walls 61. Each contacting chamber 49 comprises a contact clip 55 which engages the contact 27 on both sides. The arrangement in question can be seen even more clearly in the partial view according to FIG. 14, no contact 27 being shown in FIG. 14. As is clear from FIG. 14, the slot-like passage opening 50 of each contacting chamber 49 is protected against the ingress of water. This is done, for example, by a resilient closure device 51 in the front region of the contacting chamber 49. This resilient closure device 51 can be implemented, for example, by a first and a second resilient platelet 52, 53, which platelets are arranged on the inside in the contacting chamber 49 transversely to the insertion direction immediately after the slot-like passage opening 50. The two platelets 52, 53 can form a slight gap 54 through which the contact 27 runs. Instead of the platelets, sealing elements in the form of two beads or the like can also be provided. They only need to be made of a resilient material, such as rubber, resilient plastics material, or the like.

Figure 14:
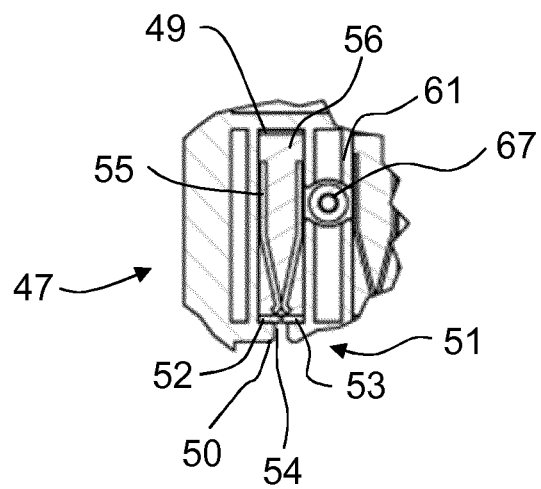
FIG. 14 is an enlarged sectional representation of a contacting chamber as part of the terminal region.

As can also be seen from FIG. 14, the corresponding contacting chamber 49 is additionally filled with a gel-like compound 56 which also ensures additional protection against the ingress of water into the contacting chamber 49. The gel-like compound 56 is preferably an electrically insulating material with a specific resistance of greater than $1\times10^{10}\Omega\times mm^2/m$, preferably greater than $1\times10^{13}\Omega\times mm^2/m$, particularly preferably greater than $1\times10^{15}\Omega\times mm^2/m$.

For example, it can be a crosslinked silicone-based gel.

The contact clips 55 are preferably molded into or injected into the battery housing 46 or into a holder connected to the latter. The contact clips 55 are also electrically connected to a printed circuit board of the battery 18 located within the battery housing 46 via suitable contacting. In the front region, the legs of the contact clips 55 converge and form the region that contacts the second surface region 42 of the contact 27.

As soon as the battery 18 is pulled out of the insert shaft 26, the resilient closure element 51 closes off the contacting chamber 49 and thereby prevents the ingress of water into the latter. The resilient closure device 51, in conjunction with the gel-like compound 56, also causes the resilient closure device 51 to strip off the gel-like compound 56 from the contact 27 of the tool 1 when removing the battery 18 from the insert shaft by pulling the contact 27 of the tool 1 out of the contacting chamber 49.

Figure 15:
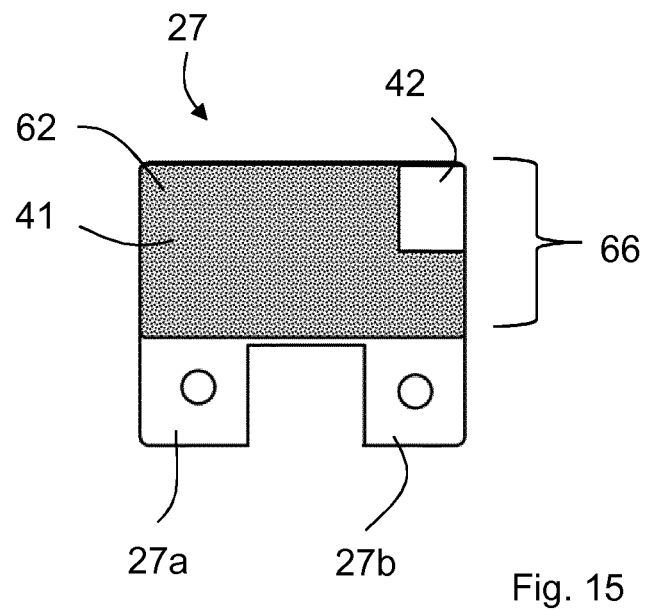
FIG. 15 is a plan view of a contact of the tool according to the invention.

FIG. 15 shows the contact 27 as such. The part of the contact 27 located in the outer region of the housing 12a is identified in FIG. 15 with the reference sign 66. The material of the contact (e.g. metal) is preferably covered with a galvanic protective layer onto which the surface protective layer 62 is in turn located in the first surface region 41 of the outside contact region 66. The second surface region 42 of the contact 27 is designed to be free of a surface protective layer. As can be seen from FIG. 15, the area of the first surface region 41 is significantly larger than the second surface region 42 which is free of the surface protective layer.

The surface protective layer 62 is preferably a lacquer layer that prevents or isolates a current flow, in particular a covering lacquer layer, preferably based on acrylic. The lacquer layer prevents electrical current from flowing to the surrounding water. Alternatively, instead of a lacquer layer, a layer of potting compound can also be provided as the surface layer, preferably a potting compound based on a casting resin or based on PU, epoxy, or silicone. The starting material of the contact 27 can, for example, be a conventional contact sheet from which the contact 27 can be punched.

The invention makes it possible to operate a tool of the type described under water, even under salt water.

It is expressly pointed out that the combination of individual features and sub-features is also to be regarded as substantial to the invention and is included in the disclosure content of the application.

LIST OF REFERENCE SIGNS

1 Tool
2 Hydraulic pump
2a Piston compressor
2b Piston compressor
3 Electric motor
4 Hydraulic cylinder
5 Piston rod
6 Control valve
7 Connecting element
8 Printed circuit board
9 Electronic component
10a Control line
10b Control line
11 Connection means
12 Housing
12a Housing battery holder
13 On/off switch
14 Display
15 First hand grip
16 Second hand grip
17 Potting compound
18 Battery
19 Hydraulic tank
20 Printed circuit board
21 Magnetic sensor
22 Printed circuit board
23a Power cable
23b Power cable
23c Power cable
24a Electrical terminal
24b Electrical terminal
24c Electrical terminal
25 Control panel
26 Insert shaft
27 Contact
27a Contact foot
27b Contact foot
28 Check valve
29 Safety valve
29 Safety valve
30 Hydraulic fluid
31 Pressure shut-off valve
32 Pressure switching valve
33 Sensor holder
34 Magnet holder
35a Tool half
35b Tool half
36 Eccentric shaft
37 Gap
38 Protrusion
39 Step
40 Predetermined separation point
41 First surface region
42 Second surface region
43 Guide web
44 Guide web
45 Surrounding frame
46 Battery housing
47 Terminal region
48 Recess
49 Contacting chamber
50 Slot-like passage opening
51 Resilient closure device
52 Platelet
53 Platelet
54 Gap
55 Contact clip
56 Gel-like compound
57 Battery cell
58 Guide lug
59 Holding projection
60 Release mechanism
61 Chamber wall
62 Surface protective layer
63 Guide
64 Circumferential seal
65 Fastening connection
66 Outside contact region
67 Fastening means

The invention claimed is:

1. A portable spreading tool, a cutting tool, or a combination tool with cutting and spreading functions, comprising:
a housing,
an electric motor located in the housing,
an insert shaft on the portable spreading tool, the cutting tool, or the combination tool,
a power supply in the form of a battery,
wherein the battery or a terminal for connecting to an external electrical energy source is located in the insert shaft,
a mechanically or hydraulically driven movable piston rod for performing spreading work, cutting work, lifting, or pressing work,
and an electronic control and regulating device for controlling or regulating the electric motor, comprising a printed circuit board which is potted with a potting compound and on which electronic components are arranged,
wherein at least one flat contact, which is made of an electrically conductive material and oriented in the insertion direction is provided on the insert shaft, said at least one flat contact having a flat surface located in the outer region of the housing and allowing a releasable electrical contact between the battery and the electronic control and regulating device of the tool by inserting the battery into the insert shaft, wherein the flat surface of the at least one flat contact is divided into a first flat surface region and a second flat surface region,
the first flat surface region is covered with a surface protective layer, and
the second flat surface region is free of the surface protective layer.

2. The portable spreading tool, the cutting tool, or the combination tool according to claim 1, wherein the first flat surface region is larger than the second flat surface region.

3. The portable spreading tool, the cutting tool, or the combination tool according to claim 1, wherein the second surface region comprises front faces of the at least one flat contact.

4. The portable spreading tool, the cutting tool, or the combination tool according to claim 1, wherein the at least one flat contact has at least one contact foot which is encapsulated and connected to the printed circuit board by potting compound.

5. The portable spreading tool, the cutting tool, or the combination tool according to claim 1, wherein a plurality of flat contacts is arranged so as to be oriented parallel to one another in an insertion direction.

6. The portable spreading tool, the cutting tool, or the combination tool according to claim 1, wherein the surface protective layer is a lacquer layer.

7. The portable spreading tool, the cutting tool, or the combination tool according to claim 1, wherein the surface protective layer is a layer of potting compound.

8. The portable spreading tool, the cutting tool, or the combination tool according to claim 1, wherein the surface protective layer is a galvanic protective layer.

9. The portable spreading tool, the cutting tool, or the combination tool according to claim 1, wherein a brushless direct-current motor is provided as the electric motor,
the electronic components of the printed circuit board are enclosed with potting compound to prevent ingress of water
comprising at least one control cable for transporting signals for controlling, the at least
one control cable having a connector for connection to the printed circuit board, and
the connector of the control cable is protected against the ingress of water.

10. The portable spreading tool, the cutting tool, or the combination tool according to claim 1, wherein no protective or sealing measures are provided on the housing to prevent ingress of water into an interior of the housing when immersing the housing in water.

11. A battery for use in the portable spreading tool, the cutting tool, or the combination tool with cutting and spreading functions, according to claim 1, comprising:
a waterproof battery housing,
battery cells arranged within the battery housing,
a terminal region free of protection against water for an electrical connection of the battery to a terminal shaft or insert shaft of the portable spreading tool, the cutting tool, or the combination tool,
wherein the terminal region has at least one contacting chamber which is accommodated in the battery housing and is accessible from outside via a slot-like passage opening and is protected against ingress of water, and in which contacting chamber at least one contact element is in the form of a contact clip.

12. Battery according to claim 11, wherein the terminal region forms an elevation on an outer housing.

13. Battery according to claim 11, wherein in the contacting chamber, in a region of the slot-like passage opening, a resilient closure device is provided which deforms when inserting a contact through the slot-like passage opening.

14. An arrangement comprising the portable spreading tool, the cutting tool, or the combination tool according to claim 1 and a battery comprising:
a waterproof battery housing;
battery cells arranged within the battery housing;
a terminal region free of protection against water for an electrical connection of the battery to a terminal shaft or insert shaft of the portable spreading tool, the cutting tool, or the combination tool;
wherein the terminal region has at least one contacting chamber which is accommodated in the battery housing and is accessible from outside via a slot-like passage opening and is protected against ingress of water, and in which contacting chamber at least one contact element is in the form of a contact clip.

15. A battery for use in a portable spreading tool, a cutting tool, or a combination tool with cutting and spreading functions, the portable spreading tool, the cutting tool, or the combination tool with cutting and spreading functions comprising a housing, an electric motor located in the housing, an insert shaft on the portable spreading tool, the cutting tool, or the combination tool, a power supply in the form of a battery, wherein the battery or a terminal for connecting to an external electrical energy source is located in the insert shaft, a mechanically or hydraulically driven movable piston rod for performing spreading work, cutting work, lifting, or pressing work, and an electronic control and regulating device for controlling or regulating the electric motor, comprising a printed circuit board which is potted with a potting compound and on which electronic components are arranged, wherein at least one flat contact, which is made of an electrically conductive material and oriented in the insertion direction is provided on the insert shaft, said at least one flat contact allowing a releasable electrical contact between the battery and the electronic control and regulating device of the tool by inserting the battery into the insert shaft, wherein the at least one flat contact is divided into a first surface region and a second surface region, the first surface region is covered with a surface protective layer, and the second surface region is free of the surface protective layer, the battery comprising:
a waterproof battery housing,
battery cells arranged within the battery housing,
a terminal region free of protection against water for an electrical connection of the battery to a terminal shaft or insert shaft of the portable spreading tool, the cutting tool, or the combination tool,
wherein the terminal region has at least one contacting chamber which is accommodated in the battery housing and is accessible from outside via a slot-like passage opening and is protected against ingress of water, and in which contacting chamber at least one contact element is in the form of a contact clip
wherein in the contacting chamber, in a region of the slot-like passage opening, a resilient closure device is provided which deforms when inserting a contact through the slot-like passage opening wherein the resilient closure device has at least two flexible sealing elements oriented transversely to the slot-like passage opening.

16. Battery according to claim 15, wherein two platelets are oriented transversely to the slot-like passage opening touch one another on a front side, form a gap between the two platelets, or overlap one another.

17. A battery for use in a portable spreading tool, a cutting tool, or a combination tool with cutting and spreading functions, the portable spreading tool, the cutting tool, or the combination tool with cutting and spreading functions comprising a housing, an electric motor located in the housing, an insert shaft on the portable spreading tool, the cutting tool, or the combination tool, a power supply in the form of a battery, wherein the battery or a terminal for connecting to an external electrical energy source is located in the insert shaft, a mechanically or hydraulically driven movable piston rod for performing spreading work, cutting work, lifting, or pressing work, and an electronic control and regulating device for controlling or regulating the electric motor, comprising a printed circuit board which is potted with a potting compound and on which electronic components are arranged, wherein at least one flat contact, which is made of an electrically conductive material and oriented in the insertion direction is provided on the insert shaft, said at least one flat contact allowing a releasable electrical contact between the battery and the electronic control and regulating device of the tool by inserting the battery into the insert shaft, wherein the at least one flat contact is divided into a first surface region and a second surface region, the first surface region is covered with a surface protective layer, and the second surface region is free of the surface protective layer, the battery comprising:

a waterproof battery housing, battery cells arranged within the battery housing, a terminal region free of protection against water for an electrical connection of the battery to a terminal shaft or insert shaft of the portable spreading tool, the cutting tool, or the combination tool, wherein the terminal region has at least one contacting chamber which is accommodated in the battery housing and is accessible from outside via a slot-like passage opening and is protected against ingress of water, and in which contacting chamber at least one contact element is in the form of a contact clip, wherein the contacting chamber is filled with a gel-like compound.

18. Battery according to claim 17, wherein the gel-like compound has a specific resistance of greater than $1\times10^{10} \Omega \times mm^2/m$.

19. Battery according to claim 17 wherein the gel-like compound (56) is a crosslinked silicone-based gel.

* * * * *